April 13, 1971            A. GOLDSMITH            3,574,583
PROCESS FOR PREPARING FOAM GLASS INSULATION
Filed Jan. 29, 1968
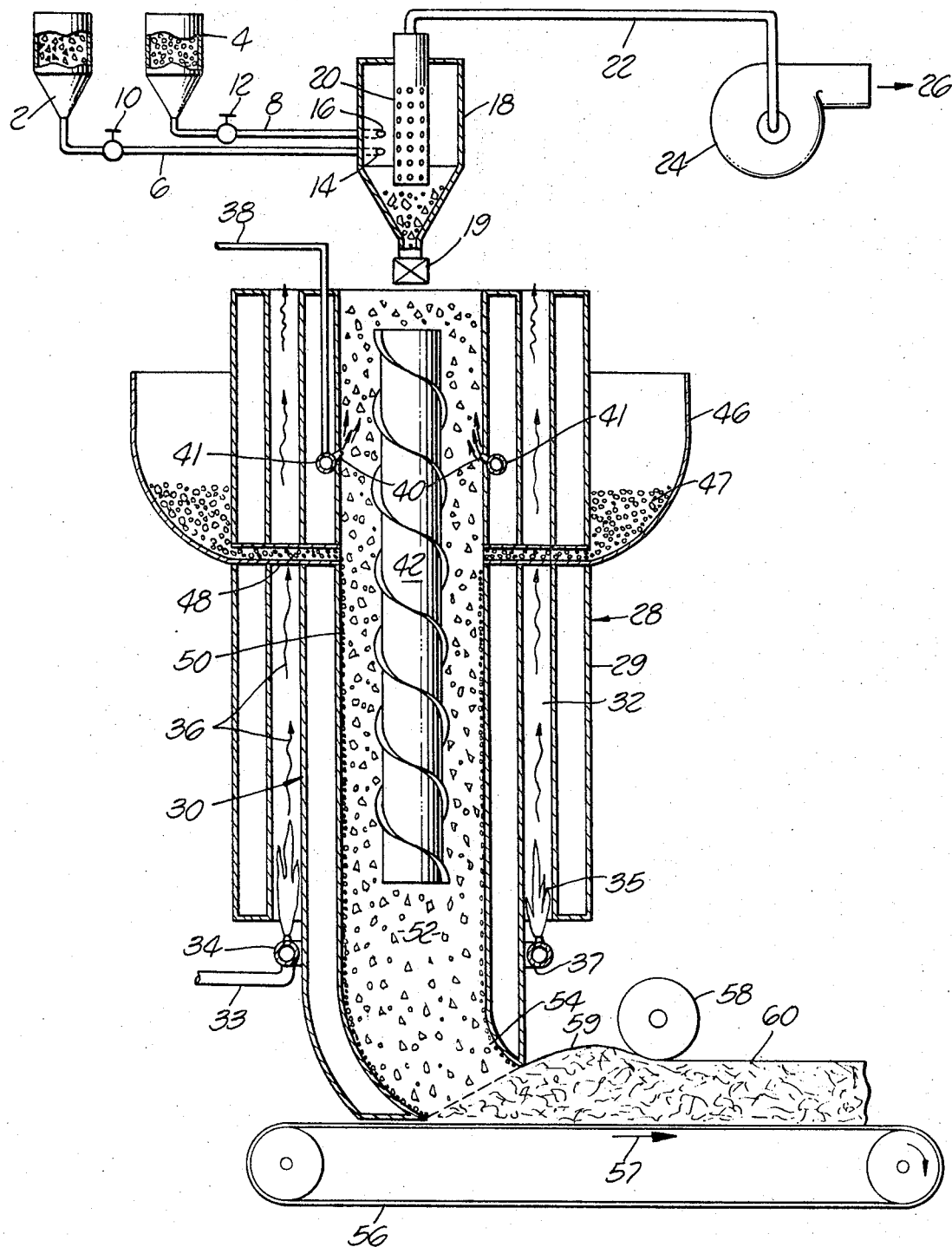
INVENTOR
AARON GOLDSMITH
BY
AGENTS 前
United States Patent Office 3,574,583
Patented Apr. 13, 1971

3,574,583
PROCESS FOR PREPARING FOAM GLASS INSULATION
Aaron Goldsmith, Sepulveda, Calif., assignor to Lockheed Aircraft Corporation, Burbank, Calif.
Filed Jan. 29, 1968, Ser. No. 701,203
Int. Cl. C03b 19/08
U.S. Cl. 65—22                             14 Claims

ABSTRACT OF THE DISCLOSURE

A process for preparing foamed glass comprising heating under pressure a glass or glasses in admixture with a vaporizable metal or a vaporizable salt, said heating being conducted to a temperature at which the mixture of glass and metal or glass and salt has a viscosity of about $10^3$ to $10^5$ poises and the metal or salt exerts a vapor pressure of about 5 to about 50 p.s.i. in excess of atmospheric pressure, releasing the pressure on the glass mixture such that the metal or salt vaporizes to form a foamed glass, and cooling the foamed glass. Preferably, the heating is carried out in a vertical furnace with the pressure supplied by the weight of the glass mixture contained in the furnace, the raw materials being charged to the top of the furnace and the molten mixture of glass and metal or glass and salt being withdrawn at the bottom of the furnace. If a salt is employed, it is one which is relatively unreactive with the glass and is at least partially soluble in the glass to lower its viscosity at the heating temperature employed in the process.

---

This invention relates to foamed glass insulation and a method for its manufacture. More specifically, the invention pertains to a method for preparing foamed glass insulation in which the glass, in admixture with a metal or salt, is heated under pressure, after which the pressure is relieved to form the foamed glass insulation.

Foamed glass insulation as such has been previously described in the technical literature. As disclosed, foamed glass may be prepared by the introduction of a metal such as cadmium, zinc, or the like, into a molten mass of glass, slag or like material. On vaporization of the finely divided metal, a large number of cells are formed within the mass of molten material. On cooling of the molten material, the metal vapors within the cells condense to create a vacuum within the cells. In order to maintain the cell structure within the glass during cooling, the prior art discloses cooling of the glass under vacuum so as to maintain an external pressure on the glass which is equal to or less than the vapor pressure of the metal vapor within the cells.

In practice, prior art processes have not been satisfactory because of the difficulty in preventing loss of the metal during vaporization and the difficulty in controlling and maintaining the cell structure within the glass through use of a controlled vacuum during cooling. As the molten glass is cooled, the cells within the glass have a tendency to contract as the vapor pressure of the metal within the cells decreases with decreasing temperature. The tendency of the cells to contract is not effectively controlled by application of an external vacuum during cooling of the glass.

As will be appreciated, the external pressures in the regions surrounding the vapor-filled cells within the molten glass are dependent upon a number of factors other than the external pressure of the atmosphere on the overall system. In practice, the temperature of the glass is not completely uniform throughout and may vary from point to point within the glass such that the viscosity and surface tension of the glass likewise vary from point to point within the glass. These variations will affect the tendency of individual cells to contract during cooling with the result that the cells will not contract uniformly.

Due to the various factors other than the pressure of the surrounding atmosphere which affect the cell structure during cooling of the glass, the prior art processes have not been satisfactory in producing a foamed glass insulation having a sufficiently uniform cell structure. Moreover, the difficulties involved in conducting a large scale high temperature manufacturing operation under conditions of a controlled vacuum are substantial and make a vacuum cooling process unattractive in terms of its cost.

A further problem with prior art processes is the difficulty in confining the vaporizable metal and preventing its loss from the system. If the metal vaporizes at too low a temperature, the glass may not be sufficiently fluid at this temperature to confine the vapors and form a foamed structure. If the metal vaporizes at too high a temperature with respect to the glass, the glass may be sufficiently fluid to confine the metal vapor as it is formed; however, during cooling of the foamed structure, its cellular structure may be lost if the temperature required to solidify the glass is below that at which the metal exerts any appreciable vapor pressure.

In solving the problems of the prior art, it is an object of the invention to provide a process which utilizes a vaporizable metal or salt or mixture thereof in admixture with a glass or glasses which mixture is heated under pressure, preferably in a vertical furnace, after which the pressure is relieved to form a foamed glass.

A further object is to provide a process in which a glass and salt are heated under pressure, the salt having a boiling point less than the melting point of the glass and being at least partially soluble in the glass to lower its melting point, with the heating being conducted to a sufficiently high temperature for the salt to assert a positive pressure within the body of glass in excess of atmospheric pressure, and thereafter relieving the pressure on the molten glass-sale mixture to form a foamed glass insulation.

Additional objects will become apparent from a reading of the specification and claims which follow.

In its broadest aspect, my invention concerns a process in which a glass or glasses is heated under pressure in admixture with a vaporizable metal or salt or mixture thereof with the pressure preferably being provided by the weight of the glass mixture as contained in a vertical furnace. In describing a preferred embodiment of my process, reference is made to the accompanying drawing which illustrates my process in schematic form. Referring to the drawing, a glass or mixture of glasses is contained in a hopper 2 and a vaporizable salt, a vaporizable metal, or a mixture thereof, is contained in a hopper 4. Both hoppers 2 and 4 are connected respectively through feed lines 6 and 8 with a mixing hopper 18. The flow of materials through feed lines 6 and 8 may be controlled by any suitable means, such as valves 10 and 12. Feed lines 6 and 8 enter the hopper 18 through openings 14 and 16, respectively.

Hopper 18 is connected by means of an exhaust line 22 with an exhaust compressor 24. Exhaust compressor 24 draws a partial vacuum on the interior of hopper 18, thereby removing gases from the materials contained therein. Preferably, the glass or glasses and the vaporizable metal, vaporizable salt, or mixture thereof, are finely divided so as to obtain homogeneity of the materials in hopper 18. In order to prevent removal of the materials from hopper 18 through exhaust line 22 in the case where they are finely divided, a screen 20 is provided. The screen 20 may have an elongated shape such that it extends into the mass of materials contained within hopper 18. This facilitates drawing a relatively uniform vacuum throughout the entire mass of material within hopper 18, which may partially surround the screen 20. Exhaust gases are discharged from the exhaust compressor as shown at 26 and a metering valve 19 controls the flow of materials from hopper 18 to a vertical furnace 28.

On discharge of material from hopper 18 into vertical furnace 28, the material moves downwardly within furnace 28 and, if desired, may be assisted in its downward movement by means of a screw conveyor 42 or similar means. The furnace 28 comprises an outer shell 29, an inner shell 30, and an annular heating space 32 positioned therebetween. The outer shell 29 may be supported relative to the inner shell 30 by any suitable support means, not shown.

In heating the vertical furnace 28, a suitable fuel, such as a gas, or mixture of gases, may be fed through a feed line 33 to a burner or series of burners 34 which may be conveniently supported by a manifold 37 positioned below the annular space 32. Flames 35 from the heaters 34 are directed into the annular space 32 to provide heated exhaust gases which travel upwardly about the exterior of the inner wall 30. The upward passage of exhaust gases is indicated at 36.

Materials charged to the furnace 28 are charged from above and move downwardly through the furnace as they are heated. In order to displace nitrogen from the materials contained within the furnace, oxygen may be fed through an input line 38 to a series of oxygen injectors 40 which may be conveniently supported by means of a toroidally shaped manifold 41 such that oxygen may be injected into the furnace at a number of positions about the inner peripheral surface of inner shell 30.

In order to assist the downward movement of the glass mixture within furnace 28, the inner wall of the furnace may be lined with a film 50 of molten metal. The film 50 may be provided by means of a metal container 46 containing a finely divided low-melting metal 47 which is fed to the furnace through a conduit or series of conduits 48. As shown in the drawing, the conduits 48 pass through the annular heating space 32 during which they are contacted with the hot exhaust gases from burners 34. This assists in the heating of the metal 47 to a molten state. On entry of the metal 47 into the furnace, it forms a film 50 which acts as a lubricant between the furnace wall and the charge, thereby facilitating movement of the charge relative to the furnace wall.

As the charge moves downwardly within the furnace, it becomes essentially a liquified mass at a lower point within the furnace as indicated at 52. Subsequent to being liquified, the charge is discharged through a furnace throat 54 onto a conveyor 56 which moves in the direction indicated by arrow 57. After leaving the furnace, the material expands in volume, as shown in the upward inclination of the surface indicated at 59, due to expansion of vapor within the molten material due to vaporization of the metal or salt. The expanded material may then be contacted by a compaction roller 58 which smooths the upper surface of the partially solidified foamed glass to leave a smooth surface as shown at 60.

If desired, the molten material may be discharged from the vertical furnace 28 through an extrusion die in which the material is formed into any suitable shape, such as, for example, a pipe or a structural member. A number of compaction rollers 58 may be used rather than merely one in forming the foamed glass insulation to its final form, and, if desired, the compaction rollers may be cooled by passage of a cold fluid through their interior portions. After the foamed glass has been suitably formed, it may be cut by a shear or other means (not shown) into appropriate lengths. Various means are known to the art for forming and cutting molten materials and the particular means employed does not form a part of my invention.

The pressures generated in vertical furnace 28, as described above, may vary from about 25 to about 50 p.s.i.g., or even higher, such as about 100 p.s.i.g. When applying my process to a mixture of a glass and a salt, which is a preferred embodiment of my invention, the salt is one which has a lower melting point than the glass. The salt in a finely divided form is contained in hopper 4 and is mixed with the finely divided glass from hopper 2 in mixing hopper 18. The melting point of the salt at atmospheric pressures in degrees Fahrenheit is preferably in the order of about one-third to about one-half of the temperature in degrees Fahrenheit required to lower the viscosity of the glass (in the absence of the salt) to about $10^5$ to about $10^7$ poises. The salt which I use is generally relatively non-reactive with the glass but is soluble to some extent in the glass so as to lower its viscosity. As the mixture of glass and salt are heated under pressure, e.g., in the vertical furnace 28, the salt goes into solution, at least partially, and lowers the viscosity of the glass. The mixture of glass and salt are heated until the glass-salt mixture has a viscosity of about $10^3$ to about $10^5$ poises. At this point, the vapor pressure exerted by the salt, which is equal to its partial molar concentration in the mixture times its absolute vapor pressure, is in excess of atmospheric pressure. In general, the vapor pressure exerted by the salt is in the order of about 5 to about 50 p.s.i. in excess of atmospheric pressure.

As the molten glass-salt mixture leaves the region of pressure, e.g., the vertical furnace 28, the salt immediately vaporizes since its vapor pressure is in excess of atmospheric pressure. As the salt vaporizes, it exerts a driving force which reduces the concentration of salt in solution within the molten glass. As salt is removed from solution through vaporization, the composition of the glass changes and its viscosity increases rapidly. The increase in the viscosity of the glass aids in the rapid solidification of the glass at a temperature at which the salt exerts a vapor pressure which maintains a foamed structure within the glass.

As pointed out previously, a principal problem in prior art methods of forming foam glass insulation has been in the maintaining of the foamed glass structure as the glass is cooled. The vapor pressure of the foam-forming ingredient, whether a vaporizable metal, a vaporizable salt, or a mixture thereof, is, of course, dependent upon temperature. As the foamed glass is cooled, the vapor pressure within the individual cells is reduced as the temperature is reduced. Due to the decrease in pressure within the cells, there is a natural tendency for te cells to contract and for the glass to lose its foamed structure during cooling.

The use of a vaporizable salt as the foaming ingredient, as described in a preferred embodiment of my process, provides a solution for the tendency of the cells to contract during cooling. The tendency of the cells to contract is offset by the fact that the viscosity of the glass increases rapidly as the salt vaporizes and, thereby reduces the concentration of salt in the glass. By employing a suitable salt as the vapor-forming ingredient, it is possible to solidify the glass at a relatively high temperature at which the salt exerts a substantial vapor pressure within the glass to maintain its foamed structure.

As the salt vaporizes and its concentration in solution in the glass decreases, the viscosity of the glass increases sharply. Initially, the viscosity of the glass-salt mixture is in the order of about $10^3$ to about $10^5$ poises immediately prior to discharge from the pressure zone, such as point 52 in the vertical furnace 28. As the salt vaporizes on removal of pressure from the system to the point where the salt concentration in solution in the glass has diminished markedly, the viscosity of the glass may reach a much higher viscosity, such as about $10^7$ to about $10^9$ poises. Also, of course, as the cells within the glass expand due to vaporization of the salt, the pressure within the cells is decreased due to their increased volume. To illustrate, the pressure within a cell, which is initially as high as about 5 to 50 pounds per square inch in excess of atmospheric pressure, may after expansion of the cell be as low as about 1 lb. per square inch in excess of atmospheric pressure.

The salts which I employ in the preferred embodiment of my process are, in general, metal halides or sulfates, although other salts may be used providing that they are miscible with the glass to lower its viscosity during heating to about $10^3$ to about $10^5$ poises, and providing further that the salt has a sufficient vapor pressure at the heating temperature employed to form bubbles within the glass when the pressure is removed. Examples of typical salts are bismuth tribromide, bismuth trichloride, bismuth triiodide, calcium difluoride, calcium dibromide, calcium diiodide, lead dibromide, lead dichloride, manganese, dichloride, manganese sulfate, tin dibromide, tin dichloride, tin tetrafluoride, tin diiodide, zinc dibromide, zinc dichloride, zinc diiodide, barium hydroxide octahydrate, aluminum tribromide, aluminum trichloride, aluminum triiodide, aluminum sulfate, antimony trichloride, antimony pentachloride, antimony trifluoride, antimony pentafluoride, antimony triiodide, antimony pentaiodide, barium diiodide, beryllium dibromide, beryllium dichloride, beryllium difluoride, beryllium diiodide, beryllium sulfate, and the like.

All of the above enumerated salts will, of course, not be compatible with all glasses which I may employ in my process. The choice of a particular vaporizable salt or the choice of a particular glass will have a great effect upon the choice of the glass or salt which is employed in conjunction with it in forming the foamed glass insulation. If, for example, the vaporizable salt is one having a very high melting point, the use of a relatively high melting glass will be required. Conversely, if the vaporizable salt is one having a relatively low melting point, the glass employed will have a correspondingly low melting point, such that on at least a partial solution of the salt in the glass, the overall viscosity of the glass-salt mixture will be in the order of about $10^3$ to about $10^5$ poises. A preferred class of salts for use in my process are metal chloride salts. Another preferred class of salts are zinc salts, and a particular salt which I have found quite useful is zinc chloride.

After releasing the pressure on the molten salt-glass mixture, and cooling of the resulting foamed glass to a temperature below the boiling point of the salt at ambient pressure, the vapor within the cells in the foamed glass condenses to create a near vacuum within the cells. The near vacuum within the cells greatly reduces heat transfer through the foamed glass by means of convection.

On use of my foamed glass as an insulating material, the salt within the cells exerts a vapor pressure which will vary in relation to the temperature at which the glass insulation is used. When the vapor pressure of the salt within the cells reaches about 50 microns, the vapor within the cells will begin to conduct heat and the insulating value of the foamed glass will decrease. In applications were it is desired that the foamed glass insulation have a very high insulating value, the salt used should be one whose vapor pressure is less than about 50 microns at the temperature at which the foamed glass is used. If the foamed glass is used as a structural material and not primarily as an insulator, the vapor pressure of the salt within the cells during use is of lesser importance and salts exerting a higher vapor pressure may be employed.

As described previously, my process is not limited to use of a salt-glass mixture, which is merely a preferred embodiment of my process. In its broader form, my invention permits the use of any foaming agent, whether a vaporizable metal, a vaporizable salt, or a mixture thereof, in conjunction with either one or several glasses in a pressure process for forming foamed glass. In prior art methods for making foamed glass, it has been difficult to control the foaming by controlling the temperature of heating. To illustrate, on heating of a mixture of a single glass with a single metal, such as zinc, to a sufficiently high temperature to vaporize the zinc, the glass may not be sufficiently fluid to form a foamed structure. If the heating is continued, the zinc may vaporize and escape from the system before the glass is sufficiently fluid to contain the zinc vapor and form a foamed structure. If the glass chosen is one which has a lower melting point, i.e., a lower viscosity at a given temperature since glasses do not have a definite melting point as such, the glass may become fluid before the vaporization temperature of the zinc is reached such that the glass contains the zinc vapors to form a foamed glass structure. On cooling of this foamed glass structure, problems may be encountered, however, in maintaining the foamed structure since the relatively low melting glass may not solidify until the cells have contracted. As the foamed glass is cooled, the vapor pressure of the zinc decreases and the cells within the foamed glass may be completely contracted by the time the material is cooled to a sufficiently low temperature to solidify the glass.

As applied to foaming agents in general, my process provides a solution to the problems of the prior art in forming foamed glass. A mixture of finely divided glass together with a finely divided foaming agent are heated in my process under a pressure of about 5 to about 50 p.s.i.g. and in a more specific form of my process under a pressure of about 25 to about 50 p.s.i.g. until the glass mixture has a viscosity of about $10^3$ to about $10^5$ poises, and the vapor pressure exerted by the foaming agent is about 5 to about 50 p.s.i. in excess of atmospheric pressure. The glass employed is preferably one having a melting point, i.e., the temperature at which the glass has a viscosity of about $10^3$ and about $10^5$ poises, which is about 200 to 300° F. in excess of the boiling point of the foaming agent at atmospheric pressure. The pressure on the mixture of molten glass and foaming agent is then released and the foamed glass is formed as the foaming agent vaporizes at atmospheric pressure. Due to the relatively high melting point of the glass with respect to the boiling point of the foaming agent at atmospheric pressure, the glass solidifies, on cooling, at a temperature at which the foaming agent exerts a sufficient vapor pressure to maintain the cellular structure of the foamed glass.

Various metals, as set forth in my prior copending application, Ser. No. 635,998, filed May 4, 1964, may be employed as foaming agents in my process. As set forth in my prior copending application, which is incorporated herein by reference, suitable metals may include zinc, cadmium, bismuth, aluminum, lead, manganese, silver, or mixtures thereof, including metal alloys as well as the pure metal. Preferred metals are bismuth, zinc, or cadmium, with zinc being particularly preferred.

Both the foaming agent, whether a vaporizable metal or salt, or a mixture thereof, and the glass are preferably in finely divided form. As an example, a suitable particle size for the glass and foaming agent may range from about 100 to about 400 mesh. The foaming agent employed should, in all cases, be relatively unreactive with the glass, i.e., not reactive to a degree which would appreciably retard vaporization of the forming agent, and should have a boiling point at atmospheric pressure which is compatible with the melting point of the glass.

Although the use of a vertical furnace is a preferred means of carrying out my process, other types of furnaces may be employed. For example, a horizontal furnace may be utilized with pressure being generated by means of a ram or conveyor which feeds the ingredients into the furnace under pressure. Also, a furnace may be employed in which the pressure within the furnace is obtained by means of a pressurized atmosphere. Various mixtures of glasses, as described in my prior copending application Ser. No. 635,998, may be used in my present process so as to obtain glass mixtures which solidify on cooling at a temperature which is higher than that required to melt the lower melting glasses in the mixture during the heating operation.

As an example of a foamed glass formed in accord with my process, I formed a mixture of 100 parts of a finely divided glass containing 75% $SiO_2$ and 25% $Na_2O$ with 10 parts of $ZnCl_2$. The mixture was heated to 400° F. under a vacuum of 100 microns of Hg for 4 hours, and then heated under pressure to 1600° F., whereupon the pressure was released and a foamed glass was formed.

As described, my process is capable of many variations using various glass or glasses, and various foaming agents coupled with various pressures and temperatures. Reference to various specific foaming agents and specific process parameters in the foregoing specification is for purposes only of illustrating my invention and various modifications may be employed within the spirit of my invention as defined in the following claims.

I claim:
1. The process for preparing a foamed glass, said process comprising:
   forming a mixture of a foaming agent comprising a vaporizable metal, a vaporizable salt, or a mixture thereof, with a glass or glasses, said metal or salt being relatively unreactive with said glass or glasses and having a boiling point less than the melting point of said glass or glasses;
   heating said mixture at a pressure ranging from about 5 to about 50 p.s.i.g. to a temperature at which said mixture has a viscosity of about $10^3$ to about $10^5$ poises at which point said vaporizable metal or vaporizable salt exerts a vapor pressure in the order of about 5 to about 50 p.s.i.g.;
   reducing said first mentioned pressure on said mixture to about atmospheric pressure whereupon said metal or salt vaporizes to form a foamed glass structure, and cooling said foamed glass structure to a temperature at which the glass solidifies, at which temperature said vaporizable metal or salt exerts a vapor pressure sufficient to maintain the cellular structure of said foamed glass.

2. The process of claim 1 wherein said foaming agent is a finely divided vaporizable metal whose boiling point at atmospheric pressure is between about 200 to about 300° F., less than the temperature required to produce a viscosity of $10^3$ to $10^5$ poises in said glass or glasses.

3. The process of claim 1 wherein said vaporizable metal is selected from the group consisting of zinc, cadmium, bismuth, or alloys or mixtures thereof.

4. The process of claim 1 wherein said metal, salt or mixture thereof, and said glass or glasses are finely divided and have a particle size ranging from about 100 to about 400 mesh.

5. The process of claim 1 wherein said vaporizable salt has a melting point at atmospheric pressure in degrees Fahrenheit which is about one-third to about one-half of the temperature in degrees Fahrenheit required to lower the viscosity of the glass or glasses in the absence of said salt to a viscosity of about $10^5$ to about $10^7$ poises, said salt being at least partially soluble in said glass or glasses to lower its viscosity to about $10^3$ to about $10^5$ poises at the heating temperature employed in said process.

6. The process of claim 5 wherein said salt is a metal chloride.

7. The process of claim 5 wherein said salt is a zinc-containing salt.

8. The process of claim 5 wherein said salt is zinc chloride.

9. The process of claim 1 wherein said heating is carried out in a vertical furnace, said mixture of vaporizable metal, vaporizable salt, or mixtures thereof, with a glass or glasses being charged to the top of said furnace such that the weight of said mixture within said furnace maintains said first mentioned pressure on said mixture ranging from about 5 to about 50 p.s.i.g. when said mixture has attained a viscosity of about $10^3$ to about $10^5$ poises, and reducing said first mentioned pressure on said mixture to about said atmospheric pressure by withdrawing said mixture from the bottom of said vertical furnace.

10. The process of claim 9 including the step of introducing a film of molten metal on the interior surface of said vertical furnace, which film acts as a lubricant between said furnace and the mixture of said glass or glasses and said foaming agent, thereby facilitating movement of said mixture relative to said furnace.

11. The process of claim 9 including the step of subjecting said mixture to a partial vacuum to remove gases therefrom prior to charging said mixture to said vertical furnace.

12. The process of claim 11 including the additional step of injecting oxygen into said mixture contained within said furnace so as to displace any residual gases contained in said mixture with oxygen.

13. The process of claim 1 wherein said first-mentioned pressure ranges from about 25 to about 50 p.s.i.g.

14. The process of claim 9 wherein said first-mentioned pressure ranges from about 25 to about 50 p.s.i.g.

References Cited

UNITED STATES PATENTS

| | | | |
|---|---|---|---|
| 2,271,845 | 2/1942 | Parsons | 106—40 |
| 2,012,617 | 8/1935 | Munters | 65—22X |
| 3,473,904 | 10/1969 | Kraemer et al. | 65—22 |

FOREIGN PATENTS

| | | | |
|---|---|---|---|
| 562,149 | 8/1958 | Canada | 65—22 |

S. LEON BASHORE, Primary Examiner

J. B. HARDAWAY, Assistant Examiner

U.S. Cl. X.R.

65—20, 24, 141; 106—40; 264—43